United States Patent [19]

Falline et al.

[11] Patent Number: 4,855,347

[45] Date of Patent: Aug. 8, 1989

[54] LACQUER COATINGS AND COATING PROCESS FOR POLYURETHANE-MOLDED ARTICLES

[75] Inventors: Brian J. Falline; Bruce W. Weihrauch, both of Moline, Ill.

[73] Assignee: Moline Paint Manufacturing Co., Moline, Ill.

[21] Appl. No.: 244,553

[22] Filed: Sep. 12, 1988

Related U.S. Application Data

[63] Continuation of Ser. No. 912,766, Sep. 26, 1986, abandoned.

[51] Int. Cl.$^4$ .......................... C08K 5/54; C08L 75/06
[52] U.S. Cl. .................................... 524/267; 524/315; 524/376; 524/379; 524/590; 264/46.6; 264/308
[58] Field of Search ................................ 524/267, 590

[56] References Cited

U.S. PATENT DOCUMENTS

| | | | |
|---|---|---|---|
| 3,186,964 | 6/1965 | Kookootsedes et al. | 260/46.5 |
| 3,551,375 | 12/1970 | Dumoulin | 524/500 |
| 3,893,868 | 7/1975 | Klement et al. | 106/38.22 |
| 4,282,285 | 8/1981 | Mohiuddin | 428/315 |
| 4,312,672 | 1/1982 | Blahak et al. | 106/38.22 |
| 4,478,893 | 10/1984 | Schonfelder et al. | 427/387 |

Primary Examiner—Warren C. Ivy
Attorney, Agent, or Firm—Woodard, Emhardt, Naughton, Moriarty & McNett

[57] ABSTRACT

An in-mold lacquer coating, and a process for utilizing the same, for producing a polyurethane-based molded article. The lacquer coating is mold-releasable without the aid of an external mold release agent, is re-coatable after de-molding without additional surface preparation, and comprising a mixture of a pre-reacted aliphatic polyurethane resin, a technically simple silicon resin mold-release agent, and an aromatic, acetate and alcoholic solvent system that is incompatible with the silicon resin and that has constituents with specific gravities less than the silicon resin and with varying rates of evaporation such that the ratio of aromatic to alcoholic solvents decreases as the solvent system evaporates.

13 Claims, No Drawings

LACQUER COATINGS AND COATING PROCESS FOR POLYURETHANE-MOLDED ARTICLES

This application is a continuation of application Ser. No. 912,766, filed Sept. 26, 1986 now abandoned.

The disclosed invention relates generally to lacquer coatings and lacquer coating processes for the in-mold surface coating of polyurethane-molded parts, and more specifically to improved lacquer coatings, and improved processes for utilizing the same, which coatings are completely mold releasable when applied directly to the surface of a mold without the prior application of an external mold release agent, and are re-coatable when de-molded without the necessity of surface preparation.

BACKGROUND OF THE INVENTION

Molds used in the production of lacquered polyurethane-molded articles, such as those used to mold lacquered polyurethane foam articles, have heretofore been pretreated with a thin layer of an external mold release agent applied directly to the mold surface before a layer of a lacquer coating is applied to the mold directly over the mold release agent film. These steps have been followed by the injection into the mold of a desired polyurethane-based plastic. After the polyurethane-based plastic cures sufficiently within the mold, the mold is opened and the molded article is removed, or "de-molded." Such external mold release agents have provided for the complete release of the lacquer coating from the surface of the mold and thereby allowed the lacquer coating to be removed intact with the molded article. Examples of external mold release agents that are known in the prior art include tetrafluoroethylene, waxes dissolved in solvents, and silicon compounds.

However, the use of external mold release agents has been shown to have one or both of the following disadvantages. It is known that a thin coating of external mold release agent is invariably present on the surface of the lacquer coating after de-molding, which can be present in sufficient amounts to prevent adhesion of a second coat of lacquer upon the first lacquer coat unless the mold release agent residue is removed by time-consuming and costly procedures. Providing such a second coat of lacquer to the molded article is often commercially desirable for either an improved exterior gloss, or to provide additional colors to provide detail, decoration, printing or design. Secondly, it is known that thin layers of external release agent may remain on the mold surface after each production cycle, which over many production cycles builds to the point of requiring removal, thereby resulting in undesirable production interruption.

It is also known to incorporate mold release agents or mold release catalysts directly into in-mold lacquer coatings used in the production of polyurethane-molded articles. These internal mold release agents and catalysts of the prior art assertedly provide a mold release function in the lacquer coating itself, doing away with the need for external mold release agents, and further provide for re-coatability of the lacquer coating without the necessity of cleaning residue from the first lacquer coating surface. However, heretofore it has not been known to incorporate silicon-based mold release agents directly into lacquer coatings for use in the production of polyurethane-molded articles without first reacting such silicon-based compounds with other constituents to render the silicon compounds suitable for use as mold release agents.

In U.S. Pat. No. 4,478,893, issued to Schonfelder et al., there is disclosed polyisocyanate addition products useful as mold release agents in the production of molded lacquer coated plastics by the in-mold coating process. But this reference discloses polysiloxanes that have isocyanate reactive end groups and are difunctional in isocyanate addition reactions as a starting material that must be further reacted with an excess of polyisocyanate and an alcohol or amine to produce the internal mold release agent disclosed in Schonfelder et al. Indeed, in Example 35 (comparative example) of the Schonfelder et al. reference, it is taught that a technically simple and nonspecialty polydimethyl siloxane compound, that is without isocyanate reactive end groups and is not further reacted in the manner taught in Schonfelder et al., was not suitable as a mold release agent for in-mold lacquer coatings in the production of lacquered polyurethane-molded articles.

The present invention provides novel mold releasable and re-coatable lacquer coatings and a novel process utilizing the same for the production of lacquered polyurethane-molded articles. Applicant's novel lacquer coatings include an effective amount of a silicon resin that functions as an internal mold release agent to provide a complete mold release function for the Applicant's novel lacquer coating, but which is present in an ineffective amount to prevent the adhesion of a second coating of the same or similar lacquer coating after de-molding. The Applicants' lacquer coatings of the present invention therefore provide for the effective use of a silicon resin as an internal mold release agent of the type the prior art teaches is not suitable as a mold release agent for use in in-mold lacquer coatings (Schonfelder et al.).

SUMMARY OF THE INVENTION

One embodiment of the Applicants' invention is an in-mold lacquer coating for a polyurethane-based molded article, which coating is mold-releasable without the aid of an external mold release agent and is re-coatable after de-molding without additional surface preparation, comprising a mixture of a pre-reacted aliphatic polyurethane resin, a silicon resin mold-release agent, and an aromatic, acetate, glycol ether, and alcoholic solvent system that is incompatible with the silicon resin and that has constituents in combination with specific gravities less than the silicon resin and with varying rates of evaporation such that the ratio of aromatic to acetate, glycol ether, and alcoholic solvents decreases as the solvent system evaporates, and that initially has at least 30% aromatic (at least 20% in the case of toluene) and 15% acetate, glycol ether, and alcoholic constituents as a percentage of the coating.

Another embodiment of the Applicants' invention is a process for producing a polyurethane-based molded article that is coated with an in-mold, mold-releasable and re-coatable lacquer, comprising the steps of coating the uncoated interior surface of the article mold with a lacquer composition that includes a mixture of a pre-reacted aliphatic polyurethane resin, a silicon resin mold-releasing agent, and an aromatic, acetate, glycol ether, and alcoholic solvent system that is incompatible with the silicon resin and that has constituents with specific gravities less than the silicon resin and with varying rates of evaporation such that the ratio of aromatic to acetate, glycol ether, and alcoholic solvents decreases as the solvent system evaporates, injecting the mold with a polyurethane-based plastic subsequent to the coating step, and de-molding the lacquer coated article.

Another embodiment of the Applicants' invention is a process for producing a polyurethane-based molded article that is coated with an in-mold, mold-releasable and re-coatable lacquer, comprising the steps of coating the uncoated interior surface of the article mold with a lacquer composition that includes a mixture of a pre-reacted aliphatic polyurethane resin, a silicon resin mold-releasing agent, and an aromatic, acetate, glycol ether, and alcoholic solvent system that is incompatible with the silicon resin and that has constituents with specific gravities less than the silicon resin and with varying rates of evaporation such that the ratio of aromatic to acetate, glycol ether, and alcoholic solvents decreases as the solvent system evaporates, injecting the mold with a polyurethane-based plastic subsequent to the coating step, de-molding the lacquer coated article, and re-coating the article with lacquer subsequent to the de-molding step without pretreatment of the coated article.

Another embodiment of the Applicants' invention is a lacquer coating for a polyurethane-based molded article the surface of which is free of mold release agent, comprising a mixture of a pre-reacted aliphatic polyurethane resin, a silicon resin, and an aromatic, acetate, glycol ether, and alcoholic solvent system that is incompatible with the silicon resin and that has constituents with specific gravities less than the silicon resin and with varying rates of evaporation such that the ratio of aromatic to acetate, glycol ether, and alcoholic solvents decreases as the solvent system evaporates.

It is an object of the present invention to provide an in-mold lacquer coating for polyurethane-based molded articles that is mold releasable without the aid of an external mold release agent and that is re-coatable with the same or other lacquer coating without surface preparation.

It is an object of the present invention to provide an in-mold lacquer coating for polyurethane-based molded articles that includes a technically simple silicon resin as an internal mold-release agent.

Related objects and advantages of the Applicants' novel lacquer coating and process will be evident from the following detailed description.

DESCRIPTION OF THE PREFERRED EMBODIMENTS

For the purposes of promoting an understanding of the principles of the invention, reference will now be made to the preferred embodiments of the Applicants' invention and specific language will be used to describe the same. It will nevertheless be understood that no limitation of the scope of the invention is thereby intended, such alterations and further modifications in the described invention, and such further applications of the principles of the invention as described therein being contemplated as would normally occur to one skilled in the art to which the invention relates.

According to the Applicants' invention there is provided, as one embodiment thereof, a novel lacquer coating suitable for use as in-mold coating for a polyurethane-molded article, which coating releases cleanly from the interior surface of the article mold without the aid of an external mold release agent, and which is re-coatable with the same or similar lacquer coatings after de-molding without surface preparation of the first lacquer coating. The lacquer coating of this embodiment comprises a mixture of a pre-reacted aliphatic polyurethane resin, a technically simple silicon resin as an internal mold-release agent, and an aromatic, acetate, glycol ether, and alcoholic solvent system.

This preferred embodiment of the Applicants' novel lacquer coating has been prepared to date utilizing readily available starting materials. Preferable pre-reacted aliphatic polyurethane resins are polyester resins that have been pre-reacted with aliphatic isocyanate in the presence of alcohol to produce aliphatic polyurethane resins of sufficient molecular weight to provide desirable ultra violet stability in the lacquer coatings of the present invention. A preferred pre-reacted aliphatic polyurethane resin has been a polyester extended aliphatic urethane elastomer resin, such as, for example, the resin marketed commercially as Spenlite Urethane L89-30S made by N.L. Chemicals of Hightstown, N.J., which has been typically commercially available as about 20–30 weight percent resin in a coequal mixture of toluene and isopropanol. Spenlite L89-30S is a fully reacted, nonyellowing elastomeric urethane solution with medium hardness which dries by solvent evaporation to produce a tough elastomeric film. Spenlite L89-30S contains no unreacted diisocyanate monomer. It is nonetheless to be understood that other suitable resins are now available and may be developed that also function effectively in the Applicants' lacquer coatings, and are considered within the scope and breadth of the disclosure and claims herein.

In the Applicants' preferred embodiment to date, the polyester extended aliphatic urethane elastomer resin has been preferably present in about 3.0% to 17% by weight of the lacquer coating, and most preferably in about 6.56% by weight. The preferred polyester extended aliphatic urethane elastomer resin, such as, for example, Spenlite Urethane L89-30S, has been, in turn, mixed with additional isopropanol and toluene, which are two of the preferred alcoholic and aromatic constituents of the solvent system of the Applicants' preferred embodiment, in sufficient quantities such that isopropanol has been preferably present in about 15% to 50% by weight of the lacquer coating, and most preferably in about 29.52% by weight, and toluene has been preferably present in about 20% to 60% by weight of the lacquer coating, and most preferably in about 43.44% by weight. To this resulting mixture has been added, under agitation, the remaining preferred constituents of the solvent system of the preferred embodiment, those being methanol which has been preferably present in about 1.0% to 30% by weight of the lacquer coating, and most preferably in about 3.58% by weight; and the following slower evaporating constituents: propoxypropanol, which has been preferably present in about 0.5% to 20% by weight of the lacquer coating, and most preferably in about 3.08% by weight; ethyl acetate, which has been preferably present in about 2.0% to 25% by weight of the lacquer coating, and most preferably in about 10.14% by weight; and ethylene glycol monobutyl ether, which has been preferably present in about 1.0% to 15% by weight of the lacquer coating, and most preferably in about 3.08% by weight. The resulting mixture is a clear urethane lacquer intermediate.

To this intermediate has been added, under agitation, a silicon resin that has a specific gravity greater than the specific gravity of any constituent of the solvent system of the preferred embodiment of the present invention. The preferred silicon resin in the Applicants' preferred embodiment to date has been a polydimethyl siloxane silicon resin, such as, for example, that marketed as Dow Corning DC-200 Polydimethyl Siloxane Silicon Fluid made by Dow Corning Corporation of Midland, Michigan, which has a specific gravity greater than any of toluene, isopropanol, methanol, ethylene glycol monobutyl ether, ethyl acetate, or propoxypropanol. Dow Corning-200 fluids are medium viscosity polydimethylsiloxane polymers manufactured to yield essentially linear polymers with average kinematic viscosities ranging from 50 to 1000 c St. Linear polydimethylsiloxane polymers characteristically have the following typical chemical composition: $(CH_3)_3SiO[SiO(CH_3)_2]_nSi(CH_3)_3$. The preferred silicon resin has been preferably present in about 0.15% to 1.15% by weight, and most preferably in about 0.60% by weight of the lacquer coating as a whole.

The resulting mixture has been the preferred embodiment lacquer coating of this embodiment of the Applicants' invention, with constituents of the approximate preferred weight percentages listed in Table 1, below:

TABLE 1

| | |
|---|---|
| Polyester Extended Aliphatic Urethane Elastomer | 6.56% |
| Polydimethyl Siloxane Silicon Resin | .60% |
| Solvent System (Total): | 92.84% |
| Toluene | 43.44% |
| Isopropanol | 29.52% |
| Methanol | 3.58% |
| Ethylene Glycol Monobutyl Ether | 3.08% |
| Ethyl Acetate | 10.14% |
| Propoxypropanol | 3.08% |

The preferred polydimethyl siloxane silicone resin of the Applicants' preferred embodiment, and most siloxane silicons, are soluble in aromatic solvents, such as toluene, for example. It has heretofore been believed that silicon compounds that are not soluble in toluene are not satisfactory mold release agents because of reported difficulties encountered in use of non-toluene-soluble silicons and because of their poor mold release performances reported. Because of the relatively high level of toluene in the preferred embodiment of the lacquer coating of the Applicants' invention, it would be expected that the preferred polydimethyl siloxane silicone resin would be soluble in the toluene. However, Applicants' discovered that the solubility of the preferred silicon resin in toluene rendered the preferred silicon resin inoperable as an effective internal mold release agent.

It was surprisingly discovered that the preferred silicon resin was effective as an internal mold release agent only after the silicon resin was rendered incompatible with the toluene constituent in the preferred embodiment solvent system and the solvent system as a whole. By incompatible is meant that the solvent system, and particularly the toluene constituent, and the silicon resin must be rendered incapable of blending into a stable homogeneous mixture. Applicants have effected this result by the addition of acetate, glycol ether, and alcoholic constituents to the preferred embodiment of the solvent system of the Applicants' invention. In the presence of the solvent system of the preferred embodiment, the silicon resin is rendered incompatible with the solvent system as a whole, due principally, it is believed, to the presence of the acetate, glycol ether, and alcohol constituents, which act to prevent the solubility of the polydimethyl siloxane silicon resin with the toluene constituent. The silicon resin is thereby placed in a colloidal-dispersion-like state within the lacquer coating.

In this regard, the number of and the particular constituents of the solvent system of the preferred embodiment are not seen as critical except that they be chosen not only to provide for incompatibility between the whole solvent system and the silicon resin, but also to provide varying rates of evaporation so the ratio of aromatic to the alcoholic, acetate and glycol ether solvents decreases as the entire solvent system evaporates during the drying phase of the lacquer coating of the present invention. The slower evaporating solvents prevent the lacquer coating from setting up too rapidly upon use, and the more quickly evaporating solvents provide lower viscosity, and bulk, to the coating. But in addition, the varying evaporation rates of the constituents of the solvent system effectively increase the incompatibility of the silicon resin mold release agent and the solvent system as the lacquer coating dries. The more volatile constituents of the solvent system of the preferred embodiment, being toluene, isopropanol, methanol, and ethyl acetate, will evaporate from the drying lacquer coating at faster rates than will the ethylene glycol monobutyl ether, and propoxypropanol, resulting in the the ratio of aromatic to alcoholic, glycol ether, and acetate constituents decreasing as the coating dries.

As the solvent system of the preferred embodiment evaporates during the drying of the lacquer, it is believed the silicon resin, which has a specific gravity greater than any constituent of the solvent system, migrates to the boundary between the mold surface and the surface of the lacquer coating as the coating dries by evaporation of the solvent system. When at the boundary of the lacquer coating and the mold surface, the silicon resin is operable to effect complete mold release of the lacquer coating from the article mold surface when curing of the plastic is sufficiently complete to demold the article.

The preferred embodiment of the lacquer coatings of the present invention, as constituted utilizing the preferred formulation above, is a clear urethane lacquer coating without significant color pigmentation. The Applicants' have discovered that the preferred embodiment of the lacquer coating of the present invention may be pigmented by the incorporation into the coating of acrylic-based pigment dispersions. However, it is critical that any solvents present in a useful pigment dispersion not destroy the silicon resin incompatibility with the solvent system of the present invention, yet also be compatible with the solvent system of the present invention so as to insure color consistency. For example, Applicants' have discovered that the pigment dispersions commercially available from Nuodex, Inc., of Piscataway, N.J., under the designation Series 844, are useful to provide color consistency to the preferred embodiments of the lacquer coatings of the present invention. Nuodex Series 844 dispersions, which include a broad spectrum of colors, may be added to the preferred embodiments of the lacquer coatings of the present invention, preferably in about 2.0 to 15 weight percent of the coatings. Nuodex Series 844 colorants are organic and inorganic pigments in an acrylic resin binder with cellosolve acetate and naphthol spirits as solvents.

As another equally preferred embodiment of the lacquer coatings of the present invention, a pigment dispersion constituent, such as, for example, Nuodex Lampblack [Series] 844 [color code] 9955, may be added to the preferred embodiment lacquer coating composition set forth in Table 1 in about 3.00% by weight of the coating to provide a preferred embodiment of a pigmented coating composition of the present invention, with the preferred formulation by weight as follows:

TABLE 2

| Polyester Extended Aliphatic Urethane Elastomer | 6.36% |
|---|---|
| Polydimethyl Siloxane Silicon Resin | .60% |
| Solvent System (Total): | 93.04% |
| Toluene | 42.13% |
| Isopropanol | 28.63% |
| Methanol | 3.47% |
| Ethylene Glycol Monobutyl Ether | 2.99% |
| Ethyl Acetate | 9.83% |
| Propoxypropanol | 2.99% |
| Nuodex Lampblack 844-9955 (black pigment dispersion) | 3.00% |

The preferred embodiment of Applicants' novel process for producing a lacquered polyurethane-based molded article comprises the steps of conventionally coating the interior surface of the article mold with Applicants' novel lacquer coating, without pre-treatment of the mold with an external mold-release agent, then conventionally injecting the mold with a polyurethane-based plastic, and de-molding the lacquered polyurethane-based molded article. The lacquered article may then be re-coated with lacquer without the intermediate step of surface preparation, such as to remove mold release agent residue.

Applicants' have discovered to date that the preferred embodiments of the lacquer coatings of the present invention are effectively used as pre-mold coatings on conventional mold surfaces composed of epoxy, aluminum, polypropylene, nickel-plating, polyester, tetrafluoroethylene, aluminum-filled epoxy, spray metals, and silicon rubber, with complete mold release of the lacquer coating without the aid of external mold release agents. Applicants' believe their coatings to be operable on urethane elastomers, urethane rigid molds, and carbon steel molds, as well. Furthermore, Applicants' lacquer coatings may be utilized as coatings for flexible and rigid polyurethane-molded parts, including integral skin and microcellular flexible polyurethane foams. In addition, Applicants' have discovered that the preferred embodiments of the lacquer coatings of the present invention may be utilized as the second coat over pre-mold coatings on flexible or rigid polyurethane-molded articles in accordance with the disclosure herein, as well as an original top coat on flexible or elastic plastics.

For the purpose of promoting a better understanding and to further illustrate the Applicants' invention, reference will now be made in the Examples below to the preferred products and process of the invention herein disclosed, but no limitation of the scope or breadth of Applicants' invention is thereby intended by way of presentation of these specific examples.

EXAMPLE 1

An aluminum injection mold for a rectangular-shaped article was heated to approximately 115° F. The preferred embodiment of the lacquer coating of the present invention which was prepared as disclosed above in the formulated as set forth in Table 2 was conventionally sprayed onto the clean interior surface of the mold to a thickness of approximately 0.4 to 0.6 mil DFT (Dried Film Thickness). The applied lacquer coating was allowed to flash off for approximately one (1) minute. A conventional integral skin polyurethane foam system was then injected into the mold and the mold is closed. The lacquer coating and foam system was allowed to cure for approximately four (4) minutes as the mold was turned in an oven at about 150° F. The article was then demolded. The lacquer coating completely and cleanly separated from the aluminum mold and was firmly and flawlessly adhered to the surface of the molded foam ball. The foam part was either re-coated with the same lacquer coating with 100% adhesion of the re-coat without prior preparation of the original lacquer coating surface, or was coated or stenciled with similar lacquer coatings, also without prior preparation of the lacquered surface.

EXAMPLE 2

Example 1 was repeated except that the mold surface was epoxy instead of aluminum. The results were substantially the same as Example 1.

EXAMPLE 3

A polypropylene injection mold for a ball-shaped article was heated to approximately 77°-82° F. The preferred embodiment of the lacquer coating of the present invention formulated as set forth in Table 2 was conventionally sprayed onto the clean interior surface of the mold to a thickness of approximately 0.4 to 0.6 mil DFT (Dried Film Thickness). The applied lacquer coating was allowed to flash off for approximately one (1) minute. A conventional microcellular polyurethane foam system was then injected into the mold and the mold was closed. The foam system was allowed to cure for approximately three (3) minutes as the mold was turned in an oven at approximately 110° F. The article was then demolded. The lacquer coating completely and cleanly separated from the polypropylene mold and was firmly and flawlessly adhered to the surface of the molded foam ball. The foam ball was either re-coated or stenciled as in Example 1 without any preparation of the lacquered surface on the foam ball.

While there has been described above the principles of this invention in connection with specific formulations, it is to be understood that these descriptions are made only by way of example and not as limitations to the scope of the invention.

What is claimed is:

1. An in-mold lacquer coating for a polyurethane-molded article, which coating is mold-releasable without the aid of an external mold release agent and is re-coatable after de-molding without additional surface preparation, comprising a mixture of a fully-reacted aliphatic polyurethane resin, a polydimethylsiloxane fluid , and a solvent system that is incompatible with said polydimethylsiloxane, having toluene, an acetate solvent, a glycol ether solvent, and alcohol solvents as discrete constituents thereof, which constituents have specific gravities less than said polydimethylsiloxane and have varying rates of evaporation such that the ratio of toluene to the alcohol, glycol ether, and acetate solvent constituents in said solvent system decreases as the constituents of said solvent system evaporate, and that initially has at least 20% toluene, and 15% acetate, glycol ether, and alcohol constituents in combination, as a weight percentage of said coating.

2. The lacquer coating of Claim 1 wherein said solvent system includes a mixture of toluene, ethyl acetate, ethylene glycol monobutyl ether, isopropanol, methanol, and propoxypropanol in about the following weight percentages:

|   |   |
|---|---|
| Solvent System (Total): | 92.84% |
| Toluene | 43.44% |
| Isopropanol | 29.52% |
| Methanol | 3.58% |
| Ethylene Glycol Monobutyl Ether | 3.08% |
| Ethyl Acetate | 10.14% |
| Propoxypropanol | 3.08% |

3. The lacquer coating of claim 1 wherein said fully-reacted aliphatic polyurethane resin includes a polyester extended aliphatic urethane elastomer present in about 3.0–17.00 weight percent.

4. The lacquer coating of claim 3 wherein said polydimethylsiloxane is present in about 0.15 to 1.15 weight percent.

5. The lacquer coating of claim 1 and further including in said solvent system a pigment dispersion present in about 2.0 to 15.0 weight percent, having dispersion solvents that do not destroy the incompatibility of said solvent system with said polydimethylsiloxane yet are compatible with other constituents of said solvent system so as to provide color consistency in the lacquer coating.

6. The lacquer coating of claim 5 with about the following formulation:

|   |   |
|---|---|
| Polyester Extended Aliphatic Urethane Elastomer | 6.36% |
| Polydimethylsiloxane fluid | .60% |
| Solvent System (Total): | 93.04% |
| Toluene | 42.13% |
| Isopropanol | 28.63% |
| Methanol | 3.47% |
| Ethylene Glycol Monobutyl Ether | 2.99% |
| Ethyl Acetate | 9.83% |
| Propoxypropanol | 2.99% |
| Pigment Dispersion | 3.00% |

7. The lacquer coating of claim 4 wherein said solvent system includes isopropanol present in about 15.0 to 50.0 weight percent.

8. The lacquer coating of claim 4 wherein said solvent system includes toluene present in about 20.0 to 60.0 weight percent.

9. The lacquer coating of claim 4 wherein said solvent system includes methanol present in about 1.0 to 30.0 weight percent.

10. The lacquer coating of claim 4 wherein said solvent system includes propoxypropanol present in about 0.5 to 20.0 weight percent.

11. The lacquer coating of claim 4 wherein said solvent system includes ethyl acetate present in about 2.0 to 25.0 weight percent.

12. The lacquer coating of claim 4 wherein said solvent system includes ethylene glycol monobutyl ether present in about 1.0 to 15.0 weight percent.

13. The lacquer coating of claim 4 with about the following formulation:

|   |   |
|---|---|
| Polyester Extended Aliphatic Urethane Elastomer | 6.56% |
| Polydimethylsiloxane fluid | .60% |
| Solvent System (Total): | 92.84% |
| Toluene | 43.44% |
| Isopropanol | 29.52% |
| Methanol | 3.58% |
| Ethylene Glycol Monobutyl Ether | 3.08% |
| Ethyl Acetate | 10.14% |
| Propoxypropanol | 3.08% |

* * * * *

UNITED STATES PATENT AND TRADEMARK OFFICE
CERTIFICATE OF CORRECTION

PATENT NO.   :   4,855,347

DATED        :   August 8, 1989

INVENTOR(S)  :   Brian J. Falline and Bruce W. Weihrauch

It is certified that error appears in the above-identified patent and that said Letters Patent is hereby corrected as shown below:

Column 2, line 55, between the words "constituents" and "as" please insert the words --in combination--.

Column 7, line 44, please delete "polyester." and insert in lieu thereof --polyester,--.

Column 8, line 6, please delete the words "in the" and insert in lieu thereof --and--.

Signed and Sealed this

Twenty-sixth Day of February, 1991

*Attest:*

HARRY F. MANBECK, JR.

*Attesting Officer*          *Commissioner of Patents and Trademarks*